United States Patent
Bar-Ness et al.

(10) Patent No.: US 7,339,884 B2
(45) Date of Patent: Mar. 4, 2008

(54) STBC MIMO-OFDM PEAK-TO-AVERAGE POWER RATIO REDUCTION BY CROSS-ANTENNA ROTATION AND INVERSION

(75) Inventors: Yeheskel Bar-Ness, Marlboro, NJ (US); Mizhou Tan, Whitehall, PA (US); Zoran Latinovic, Marlton, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 595 days.

(21) Appl. No.: 11/013,934

(22) Filed: Dec. 16, 2004

(65) Prior Publication Data
US 2006/0120268 A1 Jun. 8, 2006

Related U.S. Application Data

(60) Provisional application No. 60/634,236, filed on Dec. 8, 2004.

(51) Int. Cl.
*H04J 11/00* (2006.01)

(52) U.S. Cl. ............ 370/203; 370/334; 375/347; 375/267; 455/101

(58) Field of Classification Search ............ 370/203, 370/208, 334, 332, 333; 375/347, 267; 455/101
See application file for complete search history.

(56) References Cited

U.S. PATENT DOCUMENTS

| | | | |
|---|---|---|---|
| 2003/0076777 A1* | 4/2003 | Stuber et al. | 370/206 |
| 2006/0245346 A1* | 11/2006 | Bar-Ness et al. | 370/203 |
| 2006/0252386 A1* | 11/2006 | Boer et al. | 455/101 |
| 2007/0060073 A1* | 3/2007 | Boer et al. | 455/101 |
| 2007/0098109 A1* | 5/2007 | Vadde et al. | 375/297 |
| 2007/0217546 A1* | 9/2007 | Sandell et al. | 375/299 |

OTHER PUBLICATIONS

M. Tan and Y. Bar-Ness, "OFDM Peak-to-Average Power Ratio Reduction by Combined Symbol Rotation and Inversion with Limited Complexity," Proc. of IEEE GLOBECOM 1993, Dec. 1993, pp. 605-610.

\* cited by examiner

*Primary Examiner*—Ajit Patel
(74) *Attorney, Agent, or Firm*—Connolly Bove Lodge & Hutz LLP

(57) ABSTRACT

A signal scrambling method is provided for peak-to-average power ratio (PAPR) reduction of STBC MIMO-OFDM signals in a MIMO-OFDM system having Y transmit antenna. In general terms the OFDM sequence of symbols in said signal for each transmit antenna is divided into M sub-blocks of equal size and subclockwise rotation and inversions are performed across all transmit antennas to generate $[2Y]^M$ permuted sequence sets from the original OFDM sequence. Based on a predetermined criteria, there is then selected from the resulting sets of OFDM sequences the one with the best PAPR properties for transmission. The predetermined criteria preferably comprises identifying maximums for all $[2Y]^M$ sequence sets, by calculating the largest PAPR value of Y sequences in each set and selecting a set with the minimum maximum for transmission.

5 Claims, 3 Drawing Sheets

STBC MIMO-OFDM PEAK-TO-AVERAGE POWER RATIO REDUCTION BY CROSS-ANTENNA ROTATION AND INVERSION

RELATED APPLICATION

This application claims priority from U.S. Provisional Application Serial No. 60/634,236, filed Dec. 8, 2004.

GOVERNMENT LICENSE RIGHTS

The United States government may hold license and/or other rights in this invention as a result of financial support provided by governmental agencies in the development of aspects of the invention.

FIELD OF INVENTION

This invention relates generally to multiple-input multiple-output orthogonal frequency division multiplexing (MIMO-OFDM) for high performance 4G broadband wireless communications, and more specifically relates to large peak-to-average power ratio (PAPR) reduction by a scheme of cross-antenna rotation and inversion (CARI), which thus utilizes additional degrees of freedom by employing multiple antennas, while requiring a limited amount of side information.

BACKGROUND OF INVENTION

One main disadvantage of MIMO-OFDM is that the signals transmitted on different antennas might exhibit a prohibitively large peak-to-average power ratio (PAPR). Peak-to-average power ratio (PAPR) reduction schemes have been proposed for orthogonal frequency division multiplexing (OFDM) systems. Among them, signal scrambling methods are attractive since OFDM signals are modified without distortion to present better PAPR properties with a relatively low complexity. In MIMO-OFDM systems it would appear that a straightforward way for PAPR reduction would be to apply existing schemes proposed for OFDM systems separately on each transmit antenna.

SUMMARY OF INVENTION

In accordance with the present invention a method is applied to a MIMO-OFDM system based on cross-antenna rotation and inversion (CARI). While requiring only a small amount of side information, this scheme fully utilizes additional degrees of freedom provided by employing multiple transmit antennas. Based on two of the coinventors' previous work [M. Tan and Y. Bar-Ness, "OFDM Peak-to-Average Power Ratio Reduction by Combined Symbol Rotation and Inversion with Limited Complexity" *Proc IEEE GLOBECOM*, pp. 605-610, Dec. 2003] two suboptimal schemes termed successive suboptimal CARI (SS-CARI) and random suboptimal (RS-CARI) are also disclosed. These schemes provide a good compromise between performance and complexity. Compared with the concurrent SLM scheme proposed in [Yung-Lyul Lee et al., "Pea-to-Average Power Ratio in MIMO-OFDM Systems using Selective Mapping." *IEEE Commun. Lett.* vol. 7, pp 575-577, December 2003], the new schemes provide significant performance advantage, particularly with small number of subblocks.

DESCRIPTION OF PREFERRED EMBODIMENTS

Figure 1:
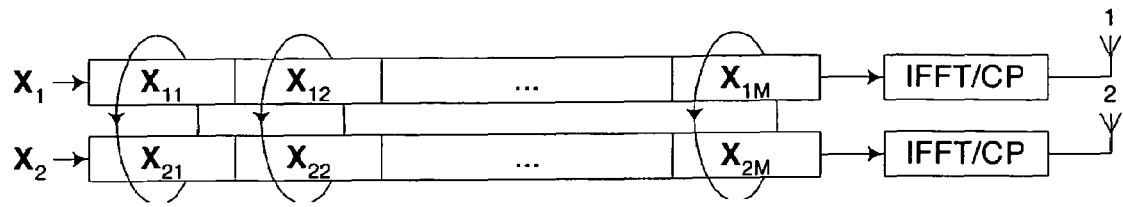
FIG. 1 schematically illustrates the method of the present invention.

By means of the invention a signal scrambling method is provided for peak-to-average power ratio (PAPR) reduction of STBC MIMO-OFDM signals in a MIMO-OFDM system having Y transmit antenna. In general terms the OFDM sequence of symbols in said signal for each transmit antenna is divided into M sub-blocks of equal size and subclockwise rotation and inversions are performed across all transmit antennas to generate $[2Y]^M$ permuted sequence sets from the original OFDM sequence. Based on a predetermined criteria, there is then selected from the resulting sets of OFDM sequences the one with the best PAPR properties for transmission. The predetermined criteria preferably comprises identifying maximums for all $[2Y]^M$ sequence sets, by calculating the largest PAPR value of Y sequences in each set and selecting a set with the minimum maximum for transmission.

For simplicity, a MIMO-OFDM system with two transmit antennas and orthogonal space-time block coding (STBC) is considered here.

With OFDM modulation, a block of $N_C$ data symbols (one OFDM symbol), $\{X_n, n=0, 1, \ldots, N_C-1\}$ will be transmitted in parallel such that each modulates a different subcarrier from a set $\{f_n, n=0, 1, \ldots, N_C-1\}$. The $N_C$ subcarriers are orthogonal, i.e., $f_n = n\Delta f$, where $\Delta f = 1/N_C T$ and $T$ is the symbol period. The resulting baseband OFDM signal x(t) of a block can be expressed as $$x(t) = \sum_{n=0}^{N_C-1} X_n e^{j2\pi f_n t}, \ 0 \leq t \leq N_C T. \tag{1}$$

The PAPR of the transmitted signal in (1) can be defined as $$PAPR = \frac{\max_{0 \leq t \leq N_C T} |x(t)|^2}{E|x(t)|^2} = \frac{\max_{0 \leq t \leq N_C T} |x(t)|^2}{\frac{1}{N_C T}\int_0^{N_C T} |x(t)|^2 \, dt}. \tag{2}$$

Since most practical systems deal with discrete-time signals, instead of reducing the continuous-time peak max|x(t)|, the maximum amplitude of $LN_C$ samples of x(t) is reduced. Parameter L denotes the oversampling factor. The case of L=1 is known as critical sampling or Nyquist rate sampling, whereas values of L>1 correspond to oversampling. It has been proved that L=4 is sufficient for capturing the continuous-time peaks [G. Wunder and H. Boche, "Peak Value Estimation of Bandlimited Signals from their Samples, Noise Enhancement, and a Local Characterization in the Neighborhood of an Extremum", *IEEE Trans. On Signal Processing*, pp. 771-780, March 2003]. To evaluate the PAPR performance accurately from the statistical point of view, the complementary cumulative distribution function (CCDF) of the PAPR of the OFDM signals is used to describe the probability of exceeding a given threshold $PAPR_0$, i.e., $$CCDF = Pr(PAPR > PAPR_0). \quad (3)$$

In MIMO-OFDM systems, two basic signaling modes can be employed, namely spatial multiplexing, which aims at increasing the data rate by spatially multiplexing independent data streams and spatial diversity coding, which exploits the spatial degrees of freedom (at the cost of rate) to improve link reliability.

For simplicity, we consider a STBC MIMO-OFDM system [K. F. Lee and D. B. Williams, "A Space-Time Coded Transmitter Diversity Technique for Frequency Selective Fading Channels" *Proc. IEEE Sensor Array and Multichannel Signal Processing Workshop*, pp. 149-152, 2000] that employs Alamouti scheme [S. M. Alamouti, "A Simple Transmit Diversity Technique for Wireless Communications," *IEEE J. Select Areas Commun.*, vol. 16, pp. 1451-1458, October 1998]. This scheme can easily be extended to STBC with more than 2 transmit antennas. During the first symbol period, two OFDM symbols $X_1=[X_{1,0}, X_{1,1}, \ldots, X_{1,N_C-1}]$ and $X_2=[X_{2,0}, X_{2,1}, \ldots, X_{2,N_C-1}]$ are transmitted from antennas 1 and 2, respectively. During the next symbol period is transmitted from antenna 1, and $X_1^*$ is transmitted from antenna 2, where $(\bullet)^*$ denotes the elementwise complex conjugate operation. It is assumed that channel remains fixed for at least two OFDM symbols.

It is not difficult to prove that $X_i$ and $\pm X_i^*$ (i=1, 2) have the same PAPR properties. Therefore, with orthogonal STBC, the PAPR reduction needs to be done only for the first symbol period. With non-orthogonal STBC, the PAPR reduction might need to be considered simultaneously on the whole set of coded OFDM symbols, transmitted in several consecutive periods.

After performing the PAPR reduction on $X_1$ and $X_2$, we obtain two modified sequences with good PAPR properties $\tilde{X}_1$ and $\tilde{X}_2$, which will be transmitted during the first symbol period. Then, during the second symbol period $-\tilde{X}_2^*$ and $\tilde{X}_1^*$ are transmitted, which have the same good PAPR properties as $\tilde{X}_2$ and $\tilde{X}_1$, respectively.

A straightforward way of reducing PAPR would be to apply the combined symbol rotation and inversion (CSRI) scheme, proposed for OFDM systems in [M. Tan and Y. Bar-Ness, "OFDM Peak-to-Average Power Ratio Reduction by Combined Symbol Rotation and Inversion with Limited Complexity" *Proc IEEE GLOBECOM*, pp. 605-610, December 2003], on each antenna separately. CSRI was proved in that publication to be an effective signal scrambling algorithm for OFDM PAPR reduction, which performs symbol rotation (cyclic shift) and inversion (changing signal signs) on the original OFDM symbols. However, it is clear that the amount of side information, needed for sequence descrambling at the receiver, increases proportionally with the number of antennas causing spectral inefficiency. Furthermore, such an approach does not utilize all available degrees of freedom produced by additional transmit antennas. This motivates the method of the present invention that we term cross-antenna rotation and inversion (CARI) depicted in FIG. 1.

FIG. 1 shows how each OFDM sequence $X_i$, i=1, 2 is first partitioned into M subblocks of equal sizes, represented as $X_i=[X_{i,1}, X_{i,2}, \ldots, X_{i,M}]$, where i denotes the index of transmit antenna. Then, instead of performing elementwise or groupwise rotation and inversion within different subblocks of each antenna separately as in [M. Tan and Y. Bar-Ness, op. cit.], we perform subblockwise rotation and inversion across all antennas. For example, with two antennas, after performing CARI on the first subblock, we obtain 4 different OFDM sets of sequences. These are: the original sets $X_1=[X_{1,1}, X_{1,2}, \ldots, X_{1,M}]$ and $X_2=[X_{2,1}, X_{2,2}, \ldots, X_{2,M}]$, the original set with the first subblock inverted $X_1=[-X_{1,1}, X_{1,2}, \ldots, X_{1,M}]$ and $X_2=[-X_{2,1}, X_{2,2}, \ldots, X_{2,M}]$, the original set with the first subblock swapped $X_1=[X_{2,1}, X_{1,2}, \ldots, X_{1,M}]$ and $X_2=[X_{1,1}, X_{2,2}, \ldots, X_{2,M}]$, and finally the same as previous set with the first subblock inverted $X_1=[-X_{2,1}, X_{1,2}, \ldots, X_{1,M}]$ and $X_2=[-X_{1,1}, X_{2,2}, \ldots, X_{2,M}]$. The same operations are then performed on all other subblocks. With M subblocks and 2 antennas, totally $4^M$ permutated sequence sets can be obtained. Out of these $4^M$ sequence sets, based on a certain predetermined criterion, a set $\{\tilde{X}_1, \tilde{X}_2\}$ with the best PAPR properties is chosen for transmission. More generally with Y transmit antennas, $[2Y]^M$ permuted sequence sets are available from which to choose the set for transmission.

In [Yung-Lyul Lee et al., op. cit.] besides implementing permutation differently than rotation and inversion as in [M. Tan and Y. Bar-Ness, op. cit.], a criterion of minimum average (minaverage) was proposed, by which, out of all permutated sequence sets, the one with the smallest average PAPR is selected for transmission. Here, we use a minimum maximum (minimax) criterion instead. For each of $4^M$ sequence sets, we first calculate the PAPR of $X_1$ and $X_2$ and denote it as $\{PAPR(X_1), PAPR(X_2)\}$. Then, we can find the maximum PAPR of $X_1$ and $X_2$ and denote it as $\max\{PAPR(X_1), PAPR(X_2)\}$. After identifying maximums for all $4^M$ sequence sets, we pick a set with the minimum $\max\{PAPR(X_1)PAPR(X_2)\}$ for transmission, denoted as $\{\tilde{X}_1, \tilde{X}_2\}$. We will show below that the minimax criterion presents significantly better performance than the minaverage.

As was pointed out in [Yung-Lyul Lee et al., op. cit.], by transmitting the same side information on different antennas, spatial diversity can be obtained ensuring higher reliability of side information. Furthermore, operating rotation and inversion on the OFDM subblocks transmitted on all antennas produce higher degrees of freedom to offset the possibility of encountering poor sequences with high PAPR. However, to find the optimal sequences, the number of permutations is still large, which motivates a search of more practical suboptimal solutions.

Successive Suboptimal CARI (SS-CARI) Scheme

In the SS-CARI scheme, we first perform CARI on subblocks $X_{1,1}, X_{2,1}$, whereas all other subblocks remain unchanged. By doing so, we will obtain 4 possible sets of transmit sequences. Then, without performing rotation and inversion on the next subblock as in the regular CARI, we calculate the PAPR for all 4 sets of sequences described before and the one with the smallest maximum PAPR is retained. Similarly, in the next step, CARI on subblocks $X_{1,2}, X_{2,2}$ is performed and out of the 4 sets, the one with the smallest maximum PAPR is retained. By doing this successively for all M subblocks, finally, the set of sequences $\{\tilde{X}_1, \tilde{X}_2\}$ is found according to the minimax criterion. The number of possible permutations with the SS-CARI scheme is reduced to 4M, whereas the number of side information bits is the same as with the original CARI scheme, which is equal to S=2M

Random Suboptimal CARI (RS-CARI) Scheme

With the RS-CARI scheme, we first produce a random matrix of dimension V×M, expressed as $$R = \begin{bmatrix} r_{1,1} & r_{1,2} & \cdots & r_{1,M} \\ r_{2,1} & r_{2,2} & \cdots & r_{2,M} \\ \vdots & \vdots & \ddots & \vdots \\ r_{V,1} & r_{V,2} & \cdots & r_{V,M} \end{bmatrix} \quad (4)$$

where V denotes the total number of permutations. Each element of this matrix is a random integer number uniformly distributed over [1,4], representing the index of 4 different sets of sequences described before.

By performing permutations on the M subblocks based on this randomly generated table, V different sequence sets can be produced and we choose the set $\{\tilde{X}_1, \ldots, \tilde{X}_2\}$ with the smallest maximum PAPR for transmission. Provided the receiver has the knowledge of the random matrix R the amount of side information required can be further reduced to $S=\log_2 V$.

Simulation Results

In the results which follow, $10^5$ random OFDM sequences were generated to obtain the CCDF's. We use 2 transmit antennas and $N^C=128$ subcarriers with QPSK data symbols. The transmitted signal is oversampled by a factor of L=4. We show only simulation results with the reduced complexity suboptimal SS-CARI and RS-CARI schemes, since the number of permutations needed is exhaustive.

Figure 2:
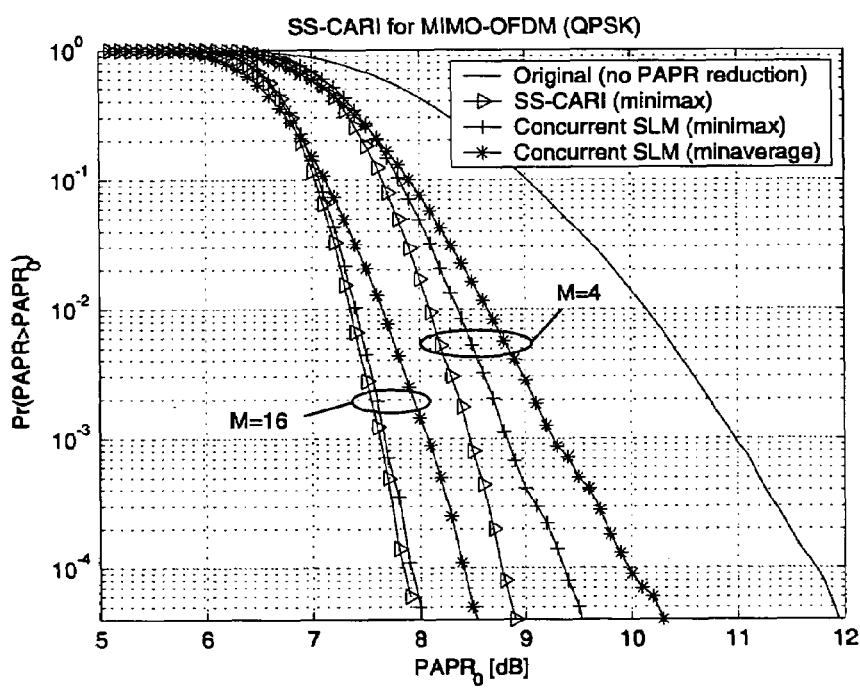
FIG. 2 is a graph illustrating the SS-CARI scheme for different values of subblocks M.

FIG. 2 shows the PAPR CCDF of the SS-CARI scheme for M=4 and M=16 subblocks. We add the performance of SLM with two different selection criteria for comparison.

There are several observations that can be made from these plots. Firstly, the proposed SS-CARI scheme for M=4 and minimax criterion achieves significantly better performance than the concurrent SLM scheme with the minaverage criterion proposed in [Yung-Lyul Lee et al., op. cit.]. To keep a similar complexity, in the concurrent SLM schemes, the OFDM sequences are also divided into M subblocks. Then for each subblock, instead of performing CARI, 4 phase weighting factors from the set $\{\pm 1, \pm j\}$ are employed to produce 4 different sets. The minimax criterion applied on the concurrent SLM scheme still performs worse than SS-CARI due to not utilizing additional degrees of freedom provided by multiple transmit antennas. Secondly, as anticipated, the minaverage criteria used in [Yung-Lyul Lee et al., op. cit.], is always outperformed by the proposed minimax criterion. Thirdly, it can be noticed from the figure that the performance of SS-CARI and concurrent SLM becomes similar for larger number of subblocks employed, e.g., M=16. However, the minimax criterion still retains significant advantage over the minaverage criterion.

Figure 3:
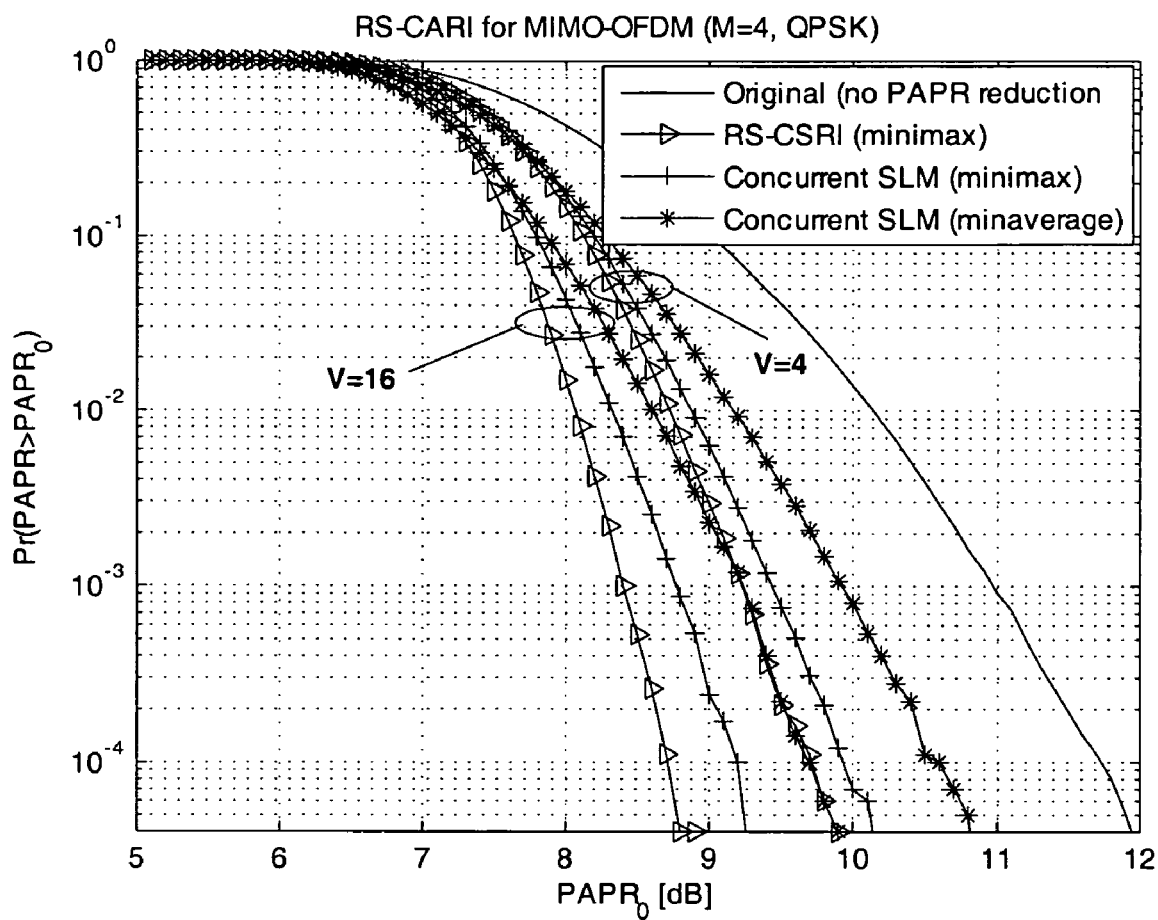
FIG. 3 is a graph illustrating the RS-CARI scheme for different values of permutation V.
Figure 4:
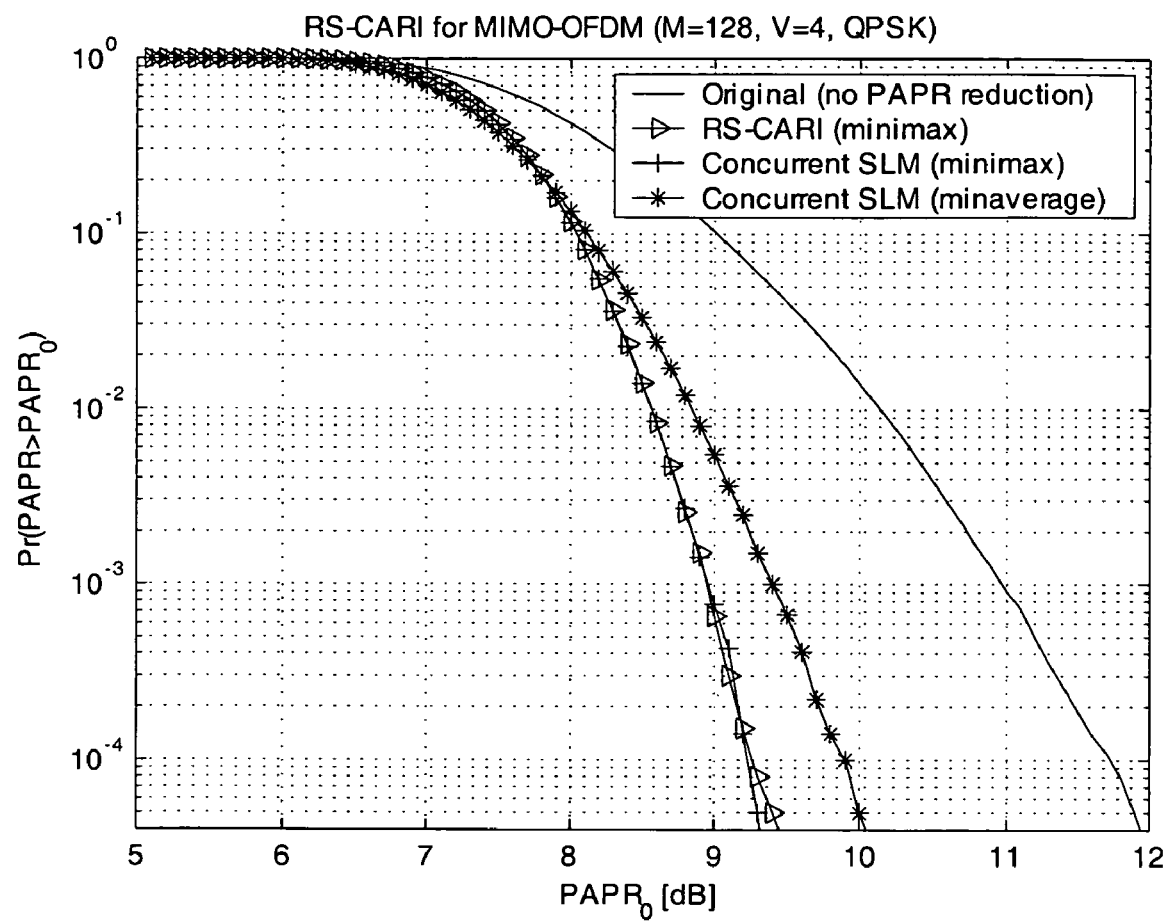
FIG. 4 is a graph illustrating the RS-CARI scheme with a large number of subblocks M.

FIGS. 3 and 4 compare the performance of RS-CARI with the concurrent SLM scheme. From these figures we can draw similar conclusions as from FIG. 2. As the number of subblocks M is small, e.g., M=4, RS-CARI presents significantly better performance than the SLM, with the same numbers of permutations. As the number of subblocks M increases, the performance of RS-CARI and concurrent SLM becomes similar, when the minimax criterion is used in both.

We also emphasize that with the CARI schemes, no complex multiplication is required for each permutation, hence, it has a lower complexity than the concurrent SLM scheme.

In summary, the method of CARI as disclosed herein not only reduces the amount of side information, but also effectively utilizes the additional degrees of freedom provided by employing multiple antennas. Furthermore, by using a minimax criterion, it achieves significantly better performance than with the minaverage criterion. Compared with the concurrent SLM scheme [Yung-Lyul Lee et al., op. cit.], the presently disclosed methods present significant performance advantages with a lower computational complexity.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A signal scrambling method for peak-to-average power ratio (PAPR) reduction of STBC MIMO-OFDM signals in a MIMO-OFDM system having Y transmit antennas, comprising:
dividing the OFDM sequence of symbols in said signal for each transmit antenna into M sub-blocks of equal size and performing subclockwise rotation and inversions across all transmit antennas to generate $[2Y]^M$ permuted sequence sets from the original OFDM sequence; and based on a predetermined criteria, selecting from the resulting said sets of OFDM sequences the one with the best PAPR property for transmission.

2. A method in accordance with claim 1 wherein said predetermined criteria comprises identifying maximums for all $[2Y]^M$ sequence sets, by calculating the largest PAPR value of Y sequences in each set and selecting a set with the minimum maximum for transmission.

3. A method in accordance with claim 1, in which CARI is performed on the first subblock for each antenna to obtain a first set of transmit sequences, the PAPR being calculated for all sequences in said first set and the set with the smallest maximum PAPR being retained; and successively performing the same procedure for successive of said sub-blocks across all transmit antennas, whereby the number of permutations considered is reduced, the PAPR is gradually reduced, and wherein the final resulting sequence is selected for transmission.

4. A method in accordance with claim 1 in which a dimension V×M matrix with random numbers is produced, where V is the total number of permutations; each item in the matrix being an integer random number uniformly distributed over [1, 2Y] representing 2Y predefined different permutation operations carried out on said M sub-blocks, and producing V different said sequence sets; and selecting the sequence with the smallest maximum PAPR for transmission, whereby the side information required for descrambling the signal is significantly reduced.

5. A method in accordance with claim 1, in which the number of transmit antennas Y is 2.

* * * * *